(12) United States Patent
McAlpine et al.

(10) Patent No.: US 6,188,822 B1
(45) Date of Patent: Feb. 13, 2001

(54) SELF-SUPPORTING FIBER OPTIC CABLE AND AN APPARATUS AND METHODS FOR MAKING THE SAME

(75) Inventors: Warren W. McAlpine, Hickory; Jeffrey A. Clampitt, Granite Falls; Ronald B. Bailey, Hickory, all of NC (US)

(73) Assignee: Siecor Operations, LLC, Hickory, NC (US)

( * ) Notice: Under 35 U.S.C. 154(b), the term of this patent shall be extended for 0 days.

(21) Appl. No.: 09/280,503

(22) Filed: Mar. 30, 1999

Related U.S. Application Data

(63) Continuation-in-part of application No. 09/102,392, filed on Jun. 22, 1998.

(51) Int. Cl.$^7$ .................................................. G02B 6/44
(52) U.S. Cl. ..................... 385/100; 109/110; 109/113
(58) Field of Search ........................... 385/109, 110, 385/113, 114, 100

(56) References Cited

U.S. PATENT DOCUMENTS

| | | |
|---|---|---|
| 3,074,107 | 1/1963 | Mase et al. . |
| 3,532,783 | 10/1970 | Pusey et al. . |
| 4,298,322 | 11/1981 | Anders et al. ........................ 425/147 |
| 4,685,875 | 8/1987 | Chevroulet et al. ................. 425/136 |
| 4,883,671 | 11/1989 | Onodera et al. ..................... 425/122 |

FOREIGN PATENT DOCUMENTS

| | | | |
|---|---|---|---|
| 46-38748 | 11/1971 | (JP) . | |
| 61-45515 | 3/1986 | (JP) | ................................ G02B/6/44 |
| 7-113932 | 5/1995 | (JP) | ................................ G02B/6/44 |
| 7-248438 | 9/1995 | (JP) | ................................ G02B/6/44 |
| 8-75969 | 3/1996 | (JP) | ................................ G02B/6/44 |
| 8-136778 | 5/1996 | (JP) | ................................ G02B/6/44 |
| 8-211260 | 8/1996 | (JP) | ................................ G02B/6/44 |
| 9-54232 | 2/1997 | (JP) | ................................ G02B/6/44 |

OTHER PUBLICATIONS

Derwent Abstract; Kokai 6–145515; Mar. 3,1986.
Derwent Abstract; Kokai 7–113932; May 5,1995.
Derwent Abstract; Kokai 7–248438; Sep. 26,1995.
Derwent Abstract; Kokai 8–211260; Aug. 20, 1996.

Primary Examiner—Frank G. Font
Assistant Examiner—Reginald A. Ratliff
(74) Attorney, Agent, or Firm—Timothey J. Aberle

(57) ABSTRACT

An apparatus and method for making a self-supporting fiber optic cable (40) having a messenger section (42) and a core section (44). The messenger section (42) and core section (44) include a jacket (47) that are interconnected by a series of webs (48) spaced by longitudinal gaps. The core section (44) includes a slotted core (45) having at least one slot with at least one optical fiber ribbon (46). Jacket (47) includes a substantially uniform cross sectional thickness. A method of making self-supporting fiber optic cable (40) comprises the steps of drawing the messenger wire (43) and the core (45) through a melt cavity including a molten jacketing material therein. Messenger section (42) and core section (44) are then defined by coating the messenger wire and the core with the molten jacketing material. Webs (48) are formed intermittently between the messenger and core sections (42,44). During the jacketing process, the pressure of the molten jacketing material is regulated so that the thickness of jacket (47) is substantially uniform along the length of self-supporting fiber optic cable (40).

14 Claims, 3 Drawing Sheets

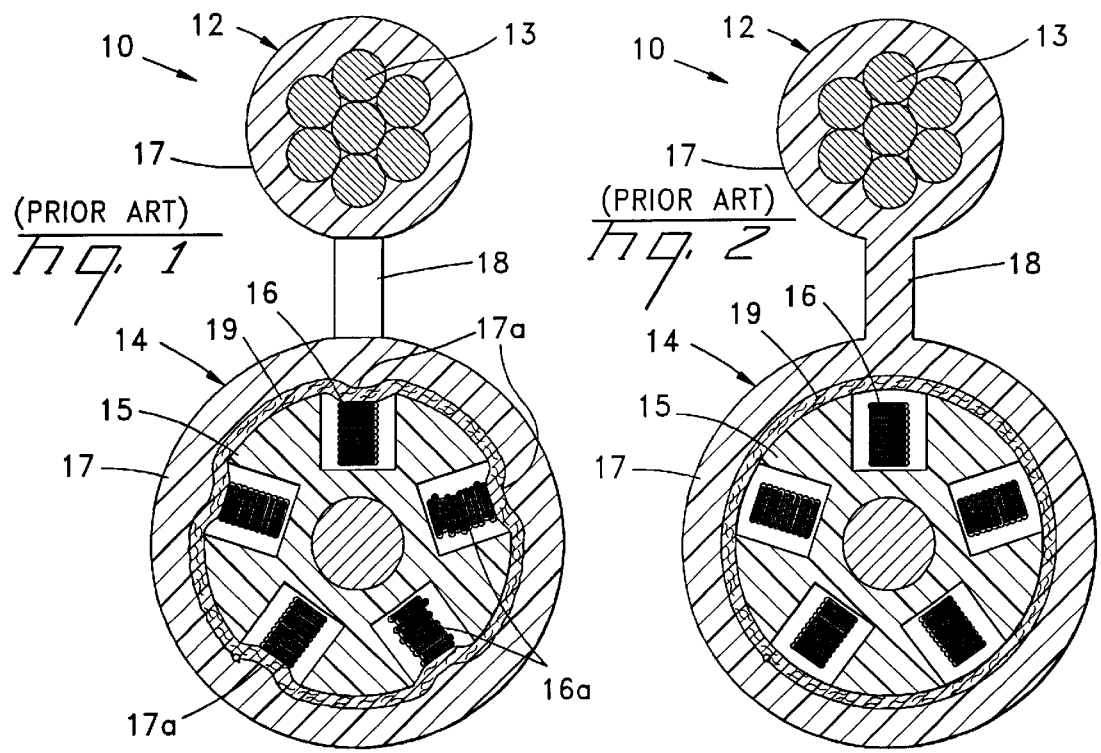
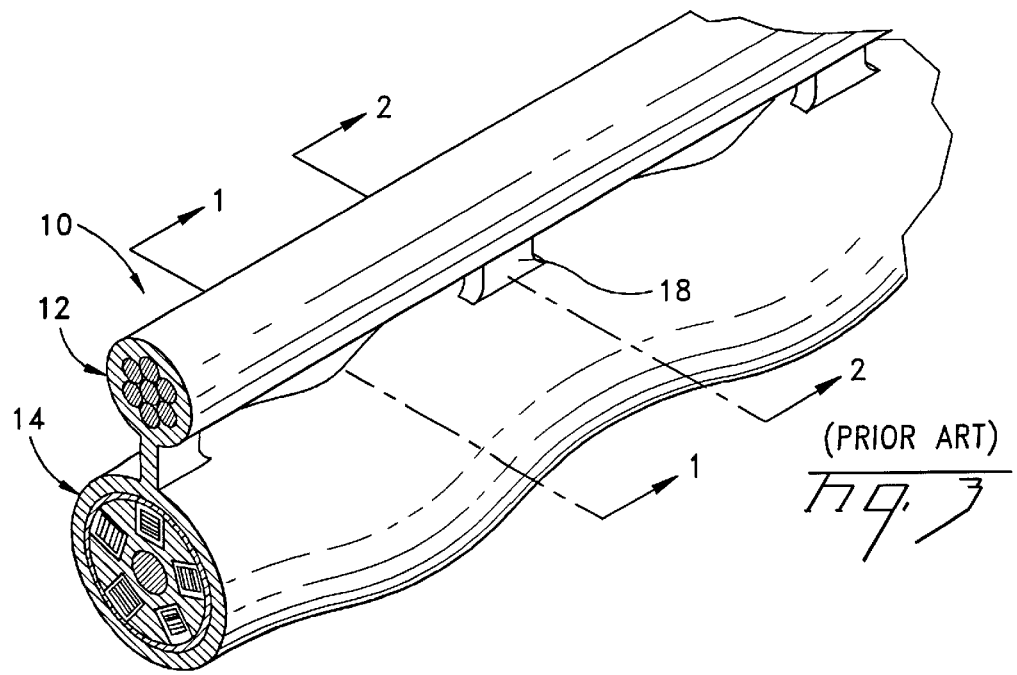

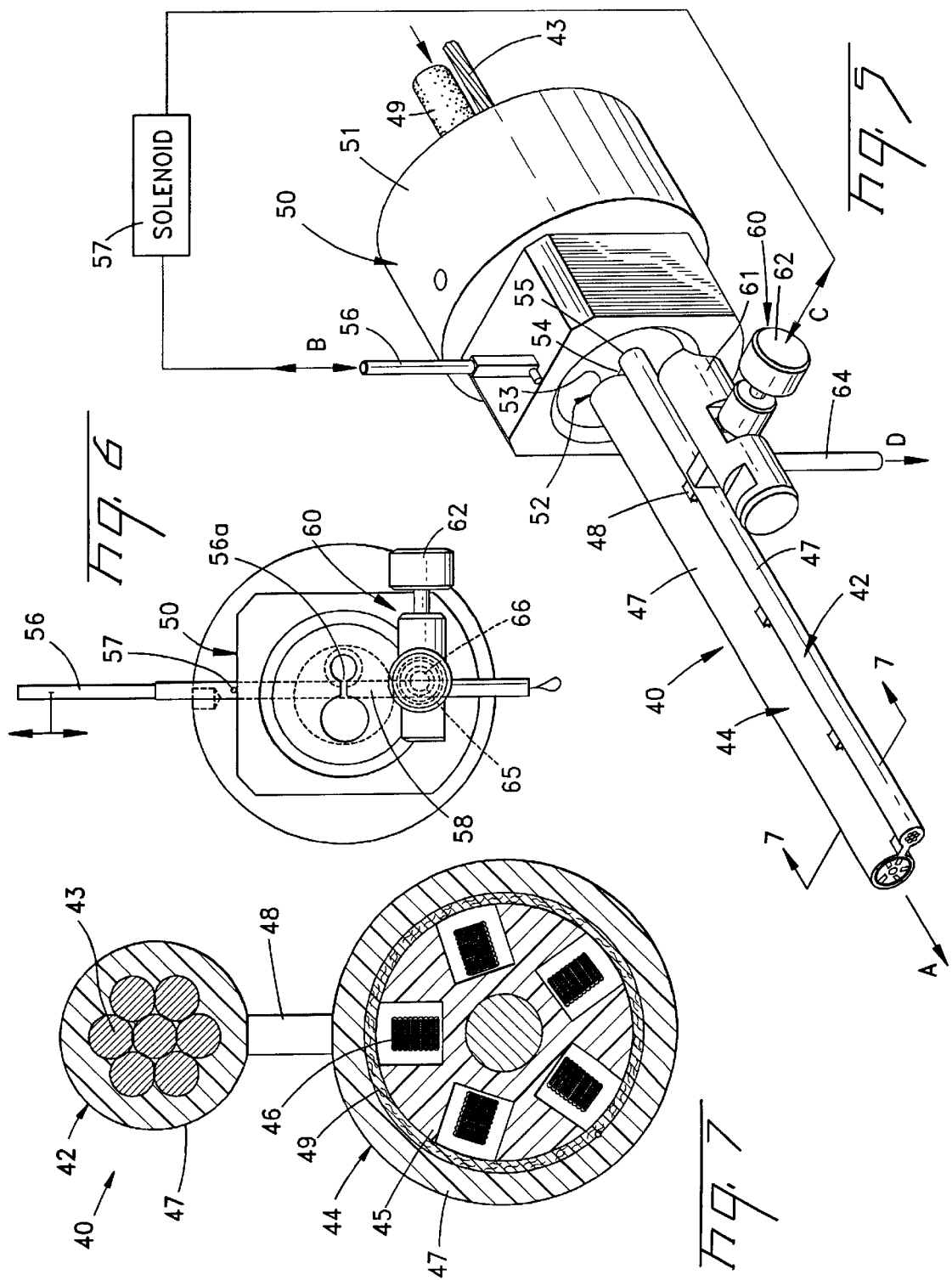

SELF-SUPPORTING FIBER OPTIC CABLE AND AN APPARATUS AND METHODS FOR MAKING THE SAME

RELATED APPLICATIONS

The present invention is a Continuation-in-Part of U.S. Ser. No. 09/102,392 filed Jun. 22, 1998, which is incorporated by reference herein.

FIELD OF INVENTION

The present invention relates to a self-supporting fiber optic cable, and an apparatus and methods for making self-supporting fiber optic cables.

BACKGROUND OF THE INVENTION

Fiber optic cables include at least one optical fiber that can transmit data, computer, and telecommunication information. Self-supporting fiber optic cables are designed for aerial applications and typically include a messenger wire and a core section having conductors therein which may be solely optical, or a combination of optical and electrical conductors. Self-supporting fiber optic cables of the "figure 8" type may be characterized into two general categories, namely, self-supporting cables with a core section having no excess length relative to the messenger wire, and self-supporting cables having a core section having an over-length, typically about 0.2%, relative to the messenger wire. Examples of known self-supporting cables having no core section over-length are disclosed in U.S. Pat. No. 4,449,012, U.S. Pat. No. 4,763,983, U.S. Pat. No. 5,095,176, and U.S. Pat. No. 5,371,823. Examples of known self-supporting cables having a core section over-length are disclosed in U.S. Pat. No. 4,662,712 and U.S. Pat. No. 4,883,671.

When installed in a self-supporting application, self-supporting cables may experience a high degree of tension. The messenger wire bears most of the tension, thereby supporting the core section, and protecting the optical fibers in the core section from high tensile forces. As tension acts on the messenger wire, however, the messenger wire tends to elongate which results in an elongation of the core section. Elongation of the core section of a self-supporting fiber optic cable not having an over-length may cause attenuation losses in the optical fibers in the core section. On the other hand, where the core section of a self-supporting cable having a core section over-length is elongated, the elongation is, up to the amount of existing over-length of the core section, advantageously taken up by the over-length in the core section whereby the core section in may be elongated without potentially causing strain and/or attenuation in the optical fibers.

Several methods of manufacturing self-supporting fiber optic cables having a core section over-length have been developed, for example, by sag formation, thermal/tensioning, and speed differential methods. In the sag formation method, for example, as is disclosed in JP-8-136778 and JP-8-211260, the core section is given an excess length in the form of sagged portions and then the messenger and the core section are bound together at spaced intervals by a wire. As an alternative to binding with wire, plastic clamps may be over-molded about the messenger and the core section, for example, as is disclosed in JP-61-29811, U.S. Pat. No. 4,883,671, and U.S. Pat. No. 4,662,712.

The thermal/tensioning or speed differential methods can be used to create the over-length. An example of the thermal/tensioning method for forming the over-length is disclosed in JP-9-54232, wherein the core section over-length is created by a heater disposed between a capstan and a brake. The heater heats the messenger wire and causes it to thermally elongate while the capstan and the brake simultaneously apply tension to the messenger wire to mechanically elongate the wire. The elongation created in the messenger wire is therefore the sum of the incremental elongations made by the thermal and mechanical elongations of the messenger wire. Alternatively, the speed differential method as disclosed in JP 8-75969 can be used to create the over-length. This method requires the core section to have a slightly faster speed as compared to the messenger section as the jacket material is extruded thereover. The difference in speed creates the over-length in the core section.

When practicing the thermal/tensioning or speed differential methods of over-length formation, a cable jacket may be simultaneously extruded about the messenger wire and the core section with intermittently formed webs connecting the messenger wire and core sections. Prior art FIGS. 1–3 show an exemplary self-supporting cable 10 that can be made by, for example, the thermal/tensioning or speed differential methods. Self-supporting cable 10 includes a messenger section 12 having steel wires 13, and a cable core section 14 having a slotted core 15, optical fiber ribbons 16, and a water absorbent tape 19 wrapped therearound. Cable core sections 12,14 include an extruded jacket 17 having a web 18 that connects the messenger and cable core sections together. Cable core section 14 can have an over-length of about 0.2% relative to messenger section 12 whereby cable core section 14 can have at least one undulation between webs 18 (FIG. 3).

The extruder used to manufacture self-supporting cables with intermittently formed webs may include a plunger, e.g., as is disclosed in JP-46-38748 and JP-8-75969. As disclosed in JP-8-75969, for example, the extruder head includes a melt cavity with a molten jacketing material therein. With reference to the manufacture of cable 10, as the messenger wires and core translate through the melt cavity they are coated with the molten jacketing material. As the messenger wires and core exit the extruder head, a die orifice determines the peripheral shape of the cable jacket therearound, and the orifice includes a web-forming area for the formation of webs 18.

The plunger operates by moving into a blocking position in the die orifice between cable sections 12 and 14, and physically blocking the molten jacketing material from forming web 18. FIG. 1 is a cross section of cable 10 where the plunger blocked the jacketing material and a corresponding longitudinal gap exists. The plunger is reciprocated in and out of the blocking position so that webs 48 are formed intermittently, spaced by longitudinal gaps. FIG. 2 depicts a cross section of cable 10 as made when the plunger was in a retracted, non-blocking position whereby web 18 was formed.

The present inventors have discovered a problem with the use of plungers that is not addressed in the foregoing background art. Namely, as the plunger is reciprocated between the blocking and non-blocking positions, the pressure of the molten jacketing material in the melt cavity can fluctuate about 50 p.s.i. or more. The pressure fluctuation in the melt cavity causes an uneven application of the jacketing material about the core section, resulting in the formation intrusion zones 17a (FIG. 1). The intrusion zones are formed in the lengths of cable corresponding to the existence of the longitudinal gaps, and the intrusion zones virtually disappear when the plunger is in the non-blocking (web-forming)

position (FIG. 2). Intrusion zones 17a can be characterized by the disadvantageous reaction of the molten jacketing material to the pressure fluctuations, i.e., the jacketing material is pushed toward the slots of core 15, and possibly forces the waterblocking tape against the ribbon stacks. When this occurs, forces acting on a ribbon stack can warp and/or disintegrate the stack structure as shown by disheveled stacks 16a (FIG. 1), and can cause undesirable microbending or macrobending of the optical fibers in the ribbons. The presence of intrusion zones 17a can negatively affect the optical performance of the cables in the final product. Moreover, after the cable is installed in the field, optical performance losses can be increased by temperature cycling and mechanically induced stresses by forcing the intrusion zones deeper into the slots. The intrusion zones can potentially counter any built-in stress avoiding benefit of the core section over-length.

OBJECTS OF THE INVENTION

In view of the foregoing, it is an object of the present invention to provide a method of making a fiber optic cable having a messenger wire and a core with at least one optical fiber therein, the method including the steps of:

(a) pulling the messenger wire and the core through a melt cavity having a molten jacketing material therein;

(b) defining a messenger section jacket and a core section jacket by coating the messenger wire and the core with the molten jacketing material;

(c) monolithically forming a series of connecting webs with the jackets during a web-forming mode, the webs being made of the molten jacketing material;

(d) forming longitudinal gaps between the connecting webs during a longitudinal gap-forming mode by switching between the web-forming and gap-forming modes; and (e) regulating the pressure of the molten jacketing material in the melt cavity during the switching to minimize pressure fluctuations.

It is another object of the present invention to provide a method of making a fiber optic cable having a messenger wire and a core with at least one optical fiber therein, the method including the steps of:

(a) pulling the messenger wire and the core through a melt cavity having a molten jacketing material therein;

(b) defining a messenger section and a core section by coating the messenger wire and the core with the molten jacketing material;

(c) intermittently forming a series of connecting webs with the molten jacketing material between the messenger and core sections; and (d) regulating the pressure of the molten jacketing material so that the molten jacketing material is applied to the core with a substantially uniform thickness along the length of the cable.

It is a further object of the present invention to provide a self-supporting fiber optic cable having a jacket with a substantially uniform cross sectional thickness in the portions of the cable where longitudinal gaps exist. In other words, the uniformity of the jacket thickness means that optical performance is preserved by substantial non-existence of intrusion zones.

BRIEF DESCRIPTION OF THE DRAWING FIGURES

FIG. 1 is a cross sectional view of a fiber optic cable according to the prior art taken at line 1—1 of FIG. 3.

FIG. 2 is a cross sectional view of a fiber optic cable according to the prior art taken at line 2—2 of FIG. 3.

FIG. 3 is an isometric view of a prior art self-supporting fiber optic cable.

FIG. 5 is an isometric view of an extruder head according to the present invention for use in manufacturing a self-supporting fiber optic cables according to the present invention.

FIG. 6 is a front view of the extruder head of FIG. 5.

FIG. 7 is a cross section of a fiber optic cable made according to the present invention taken at line 7—7 of FIG. 5.

DETAILED DESCRIPTION OF THE INVENTION

Figure 4:
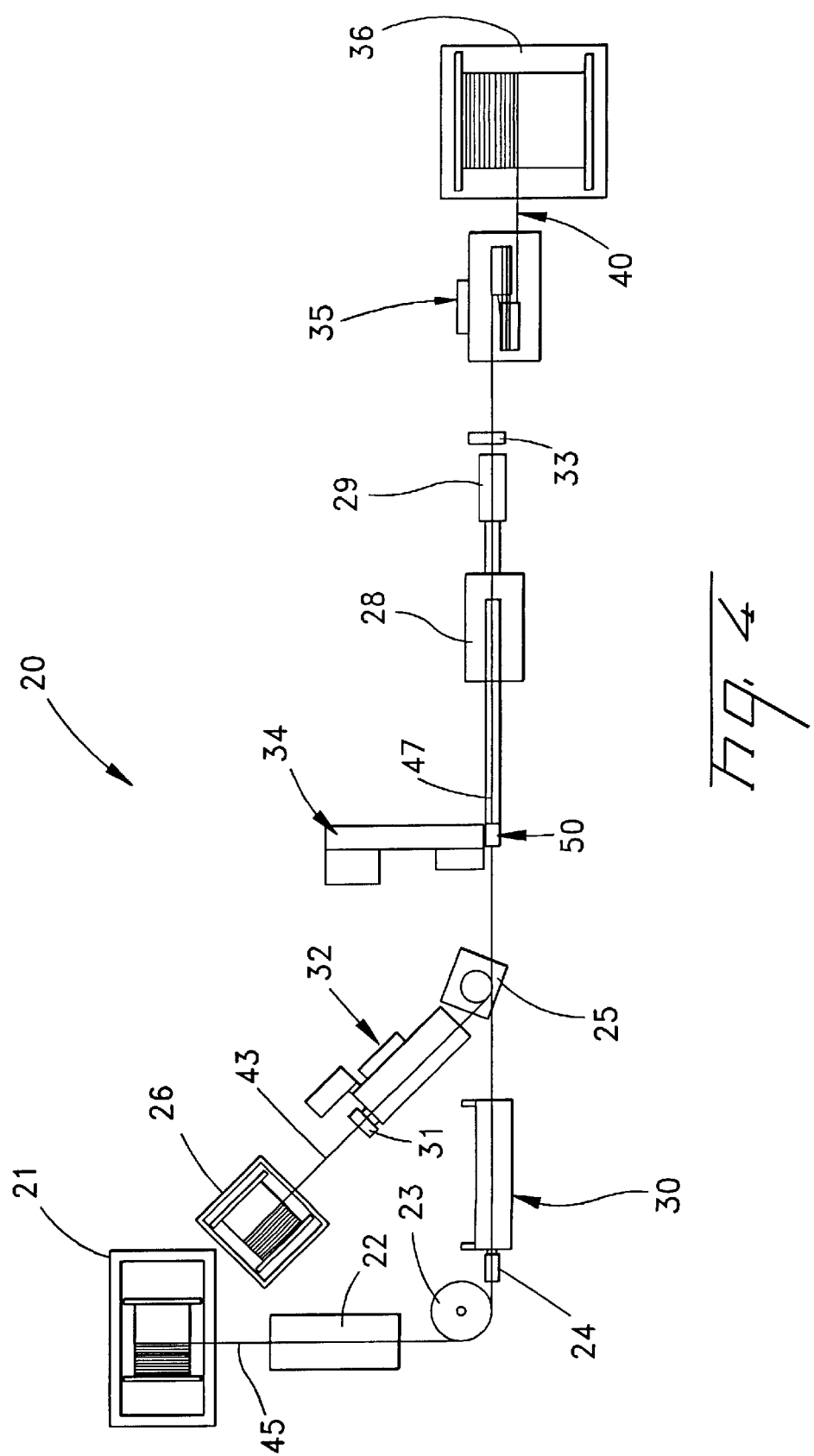
FIG. 4 is a schematic view of a cable manufacturing line for manufacturing self-supporting fiber optic cables according to the present invention.

Referring to FIG. 7, an exemplary self-supporting fiber optic cable 40 according to the present invention will be described. Self-supporting fiber optic cable 40 can be made by the extruder head apparatus and methods of the present invention. Self-supporting fiber optic cable 40 includes a cable jacket having a substantially uniform cross sectional thickness in both the portions of the cable where longitudinal gaps exist between the webs and where the connecting webs exist. In other words, in practicing the cable manufacturing methods of the present invention, the formation of the intrusion zones of prior self-supporting fiber optic cables is avoided.

According to one aspect of the present invention, self-supporting fiber optic cable 40 includes a messenger section 42 having steel wires 43, and a cable core section 44 having a slotted cable core 45. Cable core 45 can include optical fiber ribbons 46, a water absorbent tape 49 wrapped around cable core 45, and a dielectric or metallic central member. Messenger section 42 and cable core section 44 each include a common extruded jacket 47 that envelopes messenger wires 43 and tape 49. Jacket 47 includes a series of monolithically formed webs 48 that are spaced by longitudinal gaps and connect messenger and cable core sections 42,44 together. According to the present invention, jacket 47 of core section 44 includes a substantially uniform cross sectional thickness along the cable length, i.e., the cross section is substantially uniform whether at the location of the longitudinal gaps or at locations with webs 48. The substantially uniform jacket thickness means that there is a substantial lack of undesirable intrusion zones along the length of the cable which would otherwise negatively affect the optical performance of cable 40. In addition, core section 44 can be made without or with an excess length, for example, of about 0.2% relative to messenger section 42.

Additional aspects of the present invention include methods and an apparatus for making a self-supporting fiber optic cable, for example, self-supporting fiber optic cable 40. The methods and apparatus of the present invention can be embodied in a manufacturing line 20 (FIG. 4) for making a core section over-length, for example, as disclosed in U.S. Ser. No. 09/102,392, incorporated by reference hereinabove. More specifically, manufacturing line 20 can include a core pay-off 21 for paying off core 45, a dancer 22, a turning sheave 23, a length counter 24, and a turning sheave 25. Additionally, manufacturing line 20 can include a messenger wire pay-off 26 for paying off messenger wire 43, an extruder 34 with an extruder head 50 according to the present invention, a cooling trough 28, a cable dryer 29, a length counter 31, a diameter gage 33, and a cable take-up 36. Manufacturing line 20 can also include a cable core tensioning apparatus 30, a messenger wire tensioning apparatus 32, and a cable tensioning apparatus 35.

According to the present invention, extruder head 50 can be used to form jacket 47 and webs 48. Extruder head 50 extrudes molten jacketing material that forms jacket 47 and webs 48 as the cable moves along the direction of arrow A (FIG. 5). More specifically, extruder head 50 includes a body 51 with a melt cavity therein. The melt cavity receives molten jacketing material from an extruder (not shown), cable core 45 with tape 49, and messenger wire 43. Extruder head 50 also includes a die orifice 52 having a core profile area 53, a web forming section 54, and a messenger profile area 55. Core profile area 53 applies the jacketing material to tape 45 by, for example, a tube-on application combined with a draw down vacuum. Messenger profile area 55 applies the jacketing material to messenger wires 43 by, for example, pressure extrusion. Extruder head 50 also includes a plunger 56 that is mounted to body 51 for reciprocating action along the direction of arrow B (FIG. 5) between blocking and non-blocking positions with respect to web forming section 54. Plunger 56 can include a radiussed surface 56a (FIG. 6), adjacent to messenger profile area 55, that complements the outer surface of the messenger portion of jacket 47. The advance of plunger 56 is stopped by a dowel pin 57. The tip end of plunger 56 is received in a recess 58 of body 51 that permits some release of the molten jacketing material as the tip end moves into recess 58 (FIG. 6).

According to the present invention, a pressure regulating device 60 (FIGS. 5 and 6) is attached to extruder head 50 for regulating the pressure in the melt cavity. Pressure regulating device 60 includes a body 61 having a flow channel 65 (FIG. 6) that is in fluid communication with the melt cavity of body 51. A gate 62 is movably mounted to body 61 for reciprocating motion along the direction of arrow C (FIG. 5). Gate 62 includes an aperture 66 (FIG. 6), e.g. a through bore, that is in fluid communication with flow channel 65 of body 61. Aperture 66 is important to the pressure regulating function of pressure regulating device 60 because it is used to release molten jacketing material from the melt cavity. The appropriate size of aperture 66 can be determined by an empirical analysis of the pressure in the melt cavity as a function of cross sectional area of aperture 66. For example, a pressure transducer (not shown) can be used to sense the melt cavity pressure while the cross sectional area of aperture 66 is varied. A suitably sized aperture 66 will result in a melt cavity pressure that remains substantially constant, i.e., there will be substantially no pressure fluctuation in the melt cavity as plunger 56 is reciprocated between the blocking and non-blocking positions. A discharge tube 64 can be attached to body 61 for directing the released molten jacketing material to a recycle bin (not shown).

Motion is imparted to plunger 56 and gate 62 as they are switched between web-forming and gap-forming modes. Plunger 56 and gate 62 are operatively connected to motion actuating devices, for example, dual acting pneumatic cylinders (not shown). The pneumatic cylinders are both connected to a pneumatic solenoid 57, shown schematically in FIG. 5, that simultaneously controls the positions of the motion actuating devices. Solenoid 57 can be controlled by, for example, a conventional programmable logic controller (PLC) (not shown) that interfaces with a cable length counter (not shown) and is programmed to switch the solenoid based on cable length information received from the length counter. The PLC can also be programmed to change the length of webs 48 and/or the longitudinal gaps by controlling plunger 56. When solenoid 57 is switched between web-forming and longitudinal gap-forming modes by the PLC, the motion actuating devices act in parallel to cause plunger 56 and gate 62 to be switched at the same time.

Operation of extruder head 50 for applying jacket 47 and avoiding the formation of intrusion zones will now be described. In general, the method according to the present invention comprises the steps of: pulling messenger wire 43 and core 45 through a melt cavity having a molten jacketing material therein; defining messenger section 42 and core section 44 by coating the messenger wire 43 and the core 45 with the molten jacketing material; intermittently forming a series of connecting webs 48 between the messenger and core sections 43,44; and regulating the pressure of the molten jacketing material so that the molten jacketing material is applied to the core with a substantially uniform thickness along the length of self-supporting fiber optic cable 40.

More specifically, the cable core 45 with tape 49 and messenger wire 43 are moved at a suitable line speed into the melt cavity of body 51. Core profile area 53 applies the jacketing material by a tube-on process including application of a vacuum to draw jacket 47 tightly against tape 49. Messenger profile area 55 applies the jacketing material to messenger wire 43 by a pressure extrusion process whereby the interstices between the wire strands are preferably completely filled with jacketing material. The core and messenger sections 42,44 of self-supporting fiber optic cable 40 emerge from the outlet side of extruder head 50 for further processing down the line. Webs 48 are monolithically formed with jacket 47 during the process.

During the web-forming mode of the jacketing process, the molten jacketing material is expressed into web-forming section 54 thereby forming webs 48. At this point, solenoid 57 requires the motion actuating devices to position plunger 56 such that the plunger is retracted from web forming section 54, and gate 62 is positioned such that no jacketing material is passing through aperture 66. At this time in the process, the jacketing material inside the melt cavity experiences an initial melt cavity pressure.

Webs 48 are made intermittently along the length of self-supporting fiber optic cable 40. To accomplish this, solenoid 57 is repeatedly switched from the web-forming mode to the gap-forming mode and back again according to a program in the PLC. Specifically, the gap-forming mode requires plunger 56 to be in the blocking position, and gate 62 to be in a position to relieve pressure in the melt cavity by releasing molten jacketing material for the interval of time that the gaps are being formed. The purpose of pressure regulating device 60 is to maintain the pressure in the melt cavity at substantially the initial melt cavity pressure during the gap-forming mode. To accomplish this purpose, jacketing material will be released through aperture 66 during formation of the longitudinal gaps. In other words, when plunger 56 is in the blocking position and the longitudinal gaps are being formed, aperture 66 is aligned with flow channel 65, and an amount of molten jacketing material is expressed past gate 62 sufficient to avoid a substantial increase in melt cavity pressure. The amount of expressed material is roughly equal to the volume of material that would fill the longitudinal gap if the plunger was not used.

The amount of jacketing compound that is released to avoid the increase in pressure can depend upon process and extruder head variables, to name a few, the physical characteristics of the jacketing material (e.g. viscosity and density), melt cavity temperature and pressure, product line speed, the size and shape of aperture 66, and the duration of time that aperture 66 is aligned with flow channel 65. The PLC program controls the intervals of time during which the web-forming and gap-forming modes are operative. According to the present invention, the controlled release of jacketing material from the melt cavity by pressure regulating device 60 avoids substantial pressure fluctuations.

The methods of the present invention avoid the formation of intrusion zones. More specifically, cable 40 includes a substantially uniform cross sectional thickness of jacket 47 in the portions of the cable where longitudinal gaps exist between webs 48. In other words, the uniformity of the jacket thickness means that there is a lack of intrusion zones in the slots of cable core 45 that negatively affect optical performance. Some material may contract toward the slots in the core as it cools. The integrity of optical ribbon stacks 46 is preserved, and undesirable microbending or macrobending of the optical fibers in optical ribbons 46 is avoided. If cable 40 includes a core section over-length, avoiding the formation of intrusion zones can preserve the built-in stress avoiding benefit of the core section over-length especially during temperature cycling.

The present invention has been described with reference to the foregoing embodiments, which embodiments are intended to be illustrative of the present inventive concepts rather than limiting. Persons of ordinary skill in the art will appreciate that variations and modifications of the foregoing embodiments may be made without departing from the scope of the appended claims. For example, if desired, the core section over-length can be formed by thermal/tensioning or velocity differential methods. Alternatively, cables made according to the present invention can, of course, be made with no core section over-length. The methods of the present invention can include the steps of forming the messenger section jacket by a tube-on process with a draw down vacuum, and applying the core section jacket by pressure extrusion. Alternatively, the step of forming the messenger and core section jackets can include the same method of applying the jacketing material.

Accordingly, what is claimed is:

1. A method of making a fiber optic cable having a messenger wire and a core having at least one slot with at least one optical fiber therein, comprising the steps of:
   (a) pulling the messenger wire and the core through a melt cavity having a molten jacketing material therein;
   (b) defining a messenger section jacket and a core section jacket by coating the messenger wire and the core with said molten jacketing material;
   (c) monolithically forming a series of connecting webs made of said molten jacketing material during a web-forming mode;
   (d) forming longitudinal gaps between said connecting webs during a longitudinal gap-forming mode by switching between said web-forming and gap-forming modes; and
   (e) regulating the pressure of said molten jacketing material to minimize pressure fluctuations during the gap-forming mode.

2. The method of claim 1, the step of regulating the pressure being performed by releasing molten jacketing material from said melt cavity.

3. The method of claim 2, the release of said jacketing material occurring when said longitudinal gaps are being formed between said webs.

4. The method of claim 1, the step of forming said connecting webs being performed by retracting a movable member from said melt cavity.

5. The method of claim 1, the step of forming at least one of said messenger and core sections including pressure extrusion of said molten jacketing material.

6. The method of claim 1, the step of forming at least one of said messenger and core sections including tubing-on and drawing down said jacketing material with a vacuum.

7. A method of making a fiber optic cable having a messenger wire and a core having at least one slot having at least one optical fiber therein, comprising the steps of:
   (a) pulling the messenger wire and the core through a melt cavity having a molten jacketing material therein;
   (b) defining a messenger section and a core section by coating the messenger wire and the core with said molten jacketing material;
   (c) intermittently forming a series of connecting webs with said molten jacketing material between the messenger and core sections; and
   (d) regulating the pressure of said molten jacketing material so that said molten jacketing material is applied to said core with a substantially uniform thickness.

8. A self-supporting fiber optic cable, comprising:
   a messenger section and a cable core section including a jacket interconnected by a series of webs monolithically formed with said jacket and spaced by longitudinal gaps, said cable core section including a slotted core having at least one slot with at least one optical fiber therein;
   said jacket including a substantially uniform cross sectional thickness at portions of the cable where said longitudinal gaps exist.

9. The self-supporting fiber optic cable of claim 8, wherein said jacket does not include intrusion zones that negatively affect optical performance of said at least one optical fiber.

10. The self-supporting fiber optic cable of claim 8, said messenger section including wires.

11. The self-supporting fiber optic cable of claim 8, said at least one optical fiber being part of an optical fiber ribbon.

12. The self-supporting fiber optic cable of claim 8, said core being surrounded by a water blocking tape.

13. The self-supporting fiber optic cable of claim 8, said core section including a central member.

14. The self-supporting fiber optic cable of claim 8, said webs being formed by extrusion.

* * * * *